United States Patent [19]

Bendert et al.

[11] Patent Number: 5,077,658

[45] Date of Patent: Dec. 31, 1991

[54] DATA ACCESS SYSTEM FOR A FILE ACCESS PROCESSOR

[75] Inventors: Edward J. Bendert, Endicott; Robert B. Bennett, Endwell, both of N.Y.

[73] Assignee: International Business Machines Corporation, Armonk, N.Y.

[21] Appl. No.: 593,278

[22] Filed: Sep. 21, 1990

Related U.S. Application Data

[63] Continuation of Ser. No. 393,094, Aug. 2, 1989, abandoned, which is a continuation of Ser. No. 110,370, Oct. 19, 1987, abandoned.

[51] Int. Cl.$^5$ .............................................. G06F 15/40
[52] U.S. Cl. ................................. 395/600; 364/222.81; 364/228.1; 364/281.3; 364/281.6; 6/DIG. 1
[58] Field of Search ... 364/200 MS File, 900 MS File

[56] References Cited

U.S. PATENT DOCUMENTS

| | | | |
|---|---|---|---|
| 4,167,782 | 9/1979 | Joyce et al. | 364/200 |
| 4,399,504 | 8/1983 | Obermarck et al. | |
| 4,408,273 | 10/1983 | Plow | |
| 4,432,057 | 2/1984 | Daniell et al. | |
| 4,463,424 | 7/1984 | Mattson et al. | 364/300 |
| 4,480,304 | 10/1984 | Carr et al. | |
| 4,498,145 | 2/1985 | Baker et al. | |
| 4,506,326 | 3/1985 | Shaw et al. | |
| 4,507,751 | 3/1985 | Gawlich et al. | |
| 4,633,430 | 12/1986 | Cooper | 364/300 |
| 4,635,189 | 1/1987 | Kendall | 364/200 |
| 4,641,274 | 2/1987 | Swank | |
| 4,694,396 | 9/1987 | Weisshaar et al. | 364/200 |
| 4,698,752 | 10/1987 | Goldstein et al. | 364/300 |
| 4,716,528 | 12/1987 | Crus et al. | 364/300 |
| 4,769,772 | 9/1988 | Dwyer | 364/200 |
| 4,897,780 | 1/1990 | Lakness | 364/200 |

Primary Examiner—Michael R. Fleming
Assistant Examiner—Debra A. Chun
Attorney, Agent, or Firm—Whitham & Marhoefer

[57] ABSTRACT

A Data Access System for a File Access Processor for servicing requests from a set of Application Support Processors, which can exist in a global network, with each Application Support Processor sharing access to data in files stored by the File Access Processor. The File Access Processor manages access to a set of data files and information about files held in file directories, which allow for managing file collections, can relate to each other hierarchically, and may be shared. Each Application Support Processor also maintains therein an internal cache of file information to improve performance by reducing communications required with the File Access Processor for information about files. The File Access Processor provides the Application Support Processors with information for updating and maintenance of local caches of directory and file description information through a centralized accumulation and distribution of cache change notifications. The Data Access System also provides for permanent storage in the form of catalogs for retaining shared information about files, directories, and control information. A separate access method and storage facility is utilized for these catalogs from that utilized for file data, permitting flexibility in access to catalog information which require access only occasionally, while retaining high performance in the access to file data.

11 Claims, 5 Drawing Sheets

FIG. 1
DATA ACCESS SYSTEM

FIG. 2
MAJOR DATA ACCESS SYSTEM
CONTROL STRUCTURES

FIG.3

SPACE MANAGEMENT CONTROL STRUCTURES

FIG. 4

CONTROL STRUCTURES UTILIZED
BY SPACE MANAGEMENT

FIG. 5

SPACE MANAGEMENT END OF
WORK UNIT PROCESSING

DATA ACCESS SYSTEM FOR A FILE ACCESS PROCESSOR

This application is a continuation of application Ser. No. 393,094, filed Aug. 2, 1989, now abandoned which is a continuation of application Ser. No. 110,370 filed Dec. 10, 1987 now abandoned.

CROSS-REFERENCE TO RELATED PATENTS

The invention disclosed herein incorporates by reference the disclosures of U.S. Pat. Nos. 4,888,681 issued to Barnes et al. for "Space Management System for Data Files Having Shared Access" and No. 4,897,782 issued to Bennett et al. for "Local Cache Structure for Maintaining Updated File Characteristics in a File Sharing System", both of which are assigned to the assignee herewith.

BACKGROUND OF THE INVENTION

1. Field of the invention

The present invention relates generally to a Data Access System which forms a part of a File Access Processor. A File Access Processor services requests from a set of Application Support Processors, which can exist in a global network, with each Application Support Processor sharing access to data in files stored by the File Access Processor. Application Support Processors may operate asynchronously, sharing the set of file resources managed by one or more File Access Processors. A File Access Processor manages access to a set of data files and information about files held in file directories therein. File directories allow for managing file collections, can relate to each other hierarchically, and may be shared. The File Access Processor also maintains therein a set of catalogs, which are repositories of information in the File Access Processor for its own internal use, and which are not available and accessible to Application Support Processors, as are the data files and directories.

More particularly, the present invention provides a Data Access System as described wherein each Application Support Processor also maintains therein an internal cache of file information to improve performance by reducing communications required with the File Access Processor for information about files. The File Access Processor provides the Application Support Processors with information for updating and maintenance of local caches of directory and file description information through a centralized accumulation and distribution of cache change notifications.

2. Discussion of the Prior Art

For the discussion herein, the features of the present Data Access System are compared with features of two previous IBM systems, a SQL/DS system, and a VM Minidisk File System.

The SQL/DS system is based on a substantially different system design providing compiled access routines which are compiled and executed, as opposed to the present system which provides interpretive request routines which are specifically designed to accomplish particular functions.

The SQL/DS system does not provide for an internal cache of file information similar to the present invention.

Moreover, in the SQL/DS system changes by an updater become available to other users before the changes are committed. In the present system changes are not available to other Application Support Processors until the work unit is committed successfully. Each Application Support Processor retains the version of the file obtained when the file was initially accessed.

The SQL/DS system also does not provide for on-line data space administration, and provides no warning as the SQL/DS equivalent of file space thresholds are approached. Dynamic changes to space limits are not provided, and the system can only provide for migration to new data base space. The SQL/DS system basically represents an entirely different approach to recognition of space limits based on different requirements. The SQL/DS system provides an immediate recognition when a consumption limit is reached, whereas DAS Space Management permits temporarily exceeding limits (until time of commit), such that only permanent space consumption is subject to enforced limits.

The VM Minidisk File System does not provide for sharing of files or for a hierarchical directory support. There is no provision for globally maintained cache information, and no provision for work units (requires keeping temporary copies of old versions of files for example). The VM Minidisk File System does not provide for sharing of data, and for support of separate caches.

The VM Minidisk File System also has no provision for space management similar to the present invention, and only provides for mini-disks (virtual disks implemented as contiguous segments of real disks). The system does not provide a capability for on-line administration of space (changes to available space, limits, etc.) Since space is directly associated with a contiguous storage assignment, an expansion requires a reassignment to another (larger) minidisk, and physical transfer of data files leading to delays, fragmentation of space, administrative burdens, etc. Moreover, the sharing of minidisks is haphazard and awkward. No concurrency controls are provided for synchronizing multiple writers (unpredictable results). After updates, readers must re-access the minidisk or risk unpredictable results (loss of data integrity). Moreover, no space thresholds are provided.

In the VM Minidisk File System access authorization is controlled at the minidisk level, whereas the present system controls access at the file level which provides greater granularity—finer control.

SUMMARY OF THE INVENTION

Accordingly, it is a primary object of the present invention to provide a Data Access System (DAS) for a File Access Processor for servicing requests from a set of Application Support Processors (ASP), which can exist in a global network, with each Application Support Processor sharing access to data in files stored by the File Access Processor. The File Access Processor manages access to a set of data files and information about files held in file directories, which allow for managing file collections, can relate to each other hierarchically, and may be shared.

A further object of the subject invention is the provision of a File Access Processor as described wherein each Application Support Processor also maintains therein an internal cache of file information to improve performance by reducing communications required with the File Access Processor for information about files. The File Access Processor provides the Application Support Processors with information for updating and maintenance of local caches of directory and file description information through a centralized accumulation and distribution of cache change notifications.

In accordance with the teachings herein, the present invention provides a Data Access System which is structural in nature, as opposed to being algorithmic in nature, and this technical approach presents a clear separation of functions to permit high performance, allowing easy maintenance and extensibility, while supporting the required functions.

The control structures of the Data Access System support the following particular features of the design.
1. DAS Global Control anchor for all global control structures, one for all activations of the DAS.
2. DAS Local Control anchor for all DAS local control structures, one per activation of the DAS by an ASP.
3. Work Request Blocks (WRBs) support deferred updates of catalogs, space consumption values, and cache updates.
4. File Space Control Blocks (FSCBs) support dynamic threshold warnings and space consumption limits shared by all users of a filespace.
5. Cache structures in support of the central cache maintenance capability.

The design of the Data Access System provides structures for the following.
1. Maintenance of local caches of directory and file description information through centralized accumulation and distribution of cache change notifications.
2. Permanent storage in the form of catalogs for retaining shared information about files, directories, and control information. A separate access method and storage facility is utilized for these catalogs from that utilized for file data, permitting flexibility in access to catalog information (access required only occasionally), while retaining high performance in the access to file data.
3. Permanent storage and retrieval of file data blocks.
4. Fast path processing for each request type through individual and separate request processing routines, deferred updates to catalogs, and judicious balancing of in-line with centralized services.
5. Services covering routing, response formulation and buffer management, catalog access, storage management, concurrency controls, etc. that are available for request handling routines, with minimal environmental switching (in-line or fast path).
6. Grouping requests into work units that can be subject to reversal (back-out of changes) in the event of a failure and control when a second writer to a common file can gain access.
7. Concurrent activations, each servicing a logical grouping of file requests (supports sharing).
8. Previewing of catalog changes whereby the originating Application Support Processor sees changes before they are committed (end of work unit), while other Application Support Processors do not have access to them until after the commit. This is made possible through deferred updates of catalogs and in-flight search of WRBs before catalog reads.
9. On-line file space management with consumption limits and thresholds whereby more than one ASP can concurrently consume space in the same filespace and experience the same limits/thresholds. Also supports on-line administration (changes in limits, thresholds, new filespaces etc.).

The DAS Cache Management component is provided for maintaining local caches in each Application Support Processor which contain the current status of file information for cached directories. Cache Management utilizes a centralized collection of cache change information, along with facilities for recording and distributing the changes to the appropriate Access Support Processors, and includes:
1. A set of control structures for recording the information.
2. A set of functions for performing the required work.
3. Control flow descriptions, relating Cache Management with other components of DAS.

The DAS cache management design provides for data sharing and high performance, and more specifically:
1. Permits each Application Support Processor to see directory changes, even those made by others on a timely basis.
2. Concurrency controls required for the global control structures that are required to support the function.
3. Piggyback cache change notifications with normal responses.
4. Non-replicated centralized change records, Directory Change Refresh Blocks (DCRBs) minimize storage.
5. Deferred recording of changes until the successful end of a work unit.

The DAS Space Management component provides for support of on-line control of file space consumption limits in an environment where multiple ASPs can consume space in a repository (filespace) concurrently, while enforcing and supporting a common set of space consumption limits and thresholds, and includes.
1. A set of control structures for recording the limits, thresholds, and other control information for each active filespace.
2. A set of functions for performing the required work.
3. Control flow descriptions, relating Space Management with other components of DAS.
4. On-line setting and changes to consumption limits for individual filespaces.
5. On-line setting and changes to threshold levels for warnings.
6. Dynamic recording of space consumption (at commit time).
7. Dynamic reporting of threshold levels reached for each file write (hence the particular need for FSCBs).
8. Coordinated commit of Space Catalog changes with other work unit updates to catalogs etc. in such a way as to maximize concurrency.
9. Capability for backing out changes in a consistent manner in the event of a failure.

BRIEF DESCRIPTION OF THE DRAWINGS

The foregoing objects and advantages of the present invention for a Data Access System for a File Access Processor may be more readily understood by one skilled in the art with reference to the following detailed description of a preferred embodiment thereof, taken in conjunction with the accompanying drawings wherein like elements are designated by identical reference numerals throughout the several views, and in which.

DETAILED DESCRIPTION OF THE DRAWINGS

Figure 1:
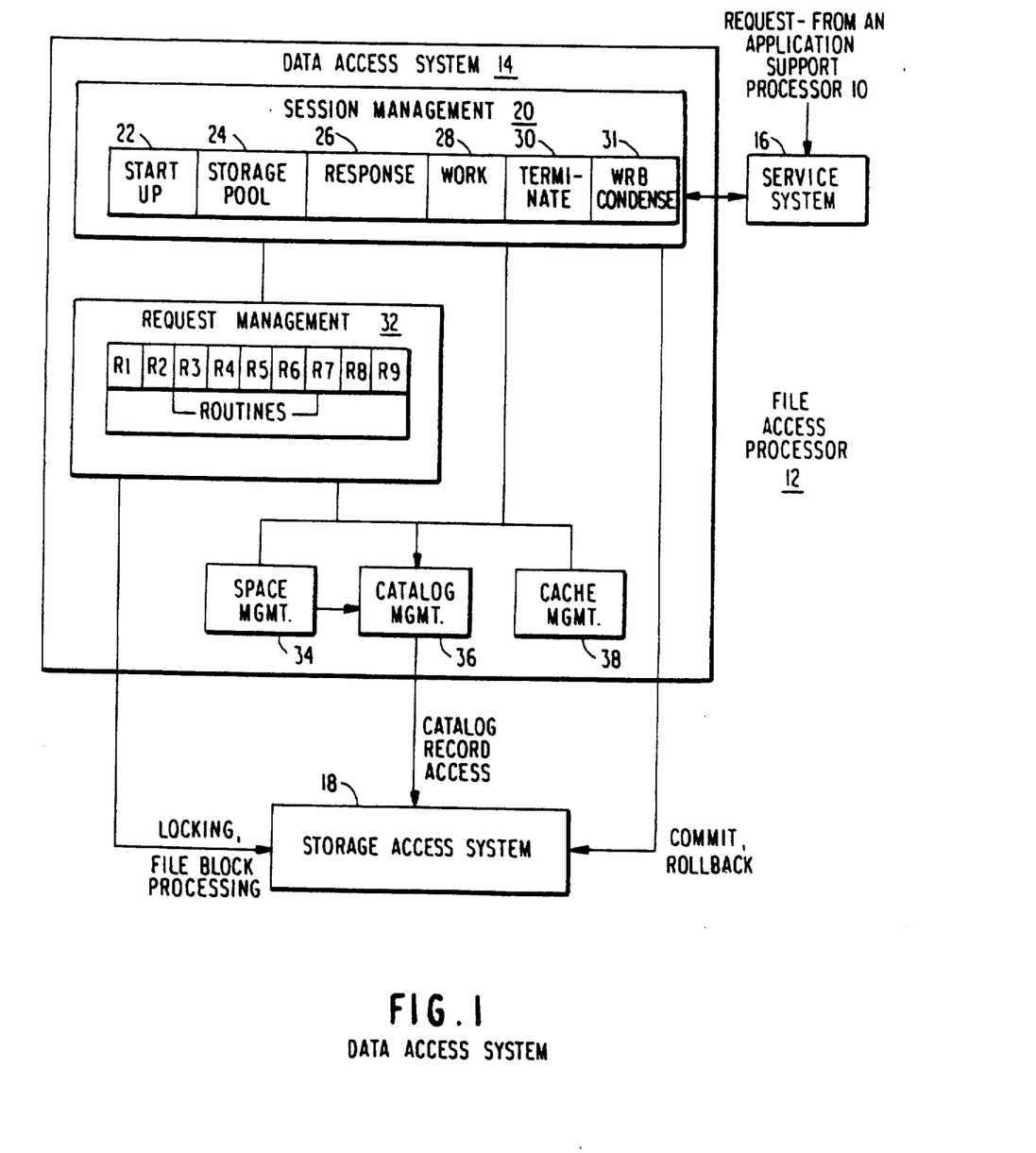
FIG. 1 illustrates the relationships between the major subcomponents of the Data Access System, as well as the relationships between it and the other two components of the File Access Processor, the Service System and the Storage Access System.

Referring to the drawings in detail, in FIG. 1 a Data Access System 14 is illustrated in terms of the functions of its subcomponents, the relationships between its subcomponents, and its relationships with other components of a File Access Processor 12.

The Data Access System 14 is one component of a File Access Processor 12, which also includes two other components, a Service System 16 and a Storage Access System 18, the functions of which are generally known in existing computer systems, and are not described in detail herein, but their basic functions are described briefly to establish perspective.

A File Access Processor 12 services requests from a set of Application Support Processors 10 which can exist in a global network, with each Application Support Processor 10 sharing access to data in files stored by the File Access Processor 12. Application Support Processors 10 may operate asynchronously, sharing the set of file resources managed by one or more File Access Processors 12. Each Application Support Processor 10 also maintains therein an internal cache of file information to improve performance by reducing communications with the File Access Processor 12 for information about files. The File Access Processor 12 provides the Application Support Processors 10 with information for updating this cache, and also responds to normal file access requests.

A File Access Processor 12 manages access to a set of data files and information about files held in file directories. File directories allow for managing file collections, relate to each other hierarchically, and may be shared. The File Access Processor also maintains therein a set of catalogs, which are repositories of internal information in the File Access Processor for its own internal use, and which are not available and accessible to Application Support Processors, as are the data files and directories. Some of the requests supported by the File Access Processor 12 are as follows:

OPEN, READ, WRITE and CLOSE for file access,
DELETE files,
COPY files,
GRANT and REVOKE authorization to files,
CREATE and DELETE directories,
OPEN, READ and CLOSE for directory access,
RENAME files and directories,
RELOCATE files from one directory to another, and
ADMINISTER file storage for files.

The primary functions of the File Access Processor 12 components are as follows.

The Service System 16 provides environmentally dependent services for the processor 12, including the initial receipt of requests, forwarding requests for file access, and dispatching and activation of the Data Access System 14 of the present invention. These activations persist through a set of file requests that represent a recoverable unit of work (defined as a work unit herein), which is explicitly concluded by a commit or rollback (back-out) request or certain other implicit terminations.

The Data Access System 14 of the present invention processes individual requests, and maintains a set of catalogs that contain control and descriptive information concerning the set of files managed by the File Access Processor 12. This information includes data file control, security, integrity, concurrency, inter-relationship, recovery, status, and control information. The Data Access System 14 also accumulates cache update information, representing changes to file descriptions and characteristics, that are forwarded to maintain current the data in the caches of the Application Support Processors.

The Storage Access System 18 manages the data blocks that comprise the data files—mapping them to external storage devices, the set of records that comprise the catalogs, the set of locks that permit concurrency, and the grouping of work items that represent recovery units. It maps access to physical data with minimal sensitivity to logical grouping or content. The Storage Access System 18 runs in the same activation as the Data Access System 14 that invokes it.

The Data Access System 14 Subcomponents have the following functions.

The Session Management Subcomponent 20 is at the hierarchical top of Data Access System 14 request processing. It receives requests through the Service System 16. It is the focal point of control and includes a set of fundamental services for response formulation. It determines which Request Management Subcomponent 32 routine should be invoked to service the request and passes control to it. At the end of request processing, control is passed back to the Session Management Subcomponent 20 to finish request processing and forward the requested response.

The Session Management Subcomponent provides the primary routing and control functions for the Data Access System. In addition, it manages work units, supports deferred commit of work, supports response buffer management and ordering, as well as initialization and termination of the Data Access System. A number of routines support the operation of Session Management. Some of these routines are also utilized by other subcomponents of the Data Access System as common services.

Following are some of the service routines included in the Session Management Subcomponent 20.

Start-up routine 22—to initialize Data Access System 14 control structures.

Storage Pool routine 24—to maintain and dispense working storage for control structures. The Pool Routine is a general Data Access System service for allocating and de-allocating control structures from large blocks of working storage. The routine supports allocating or deallocating single or multiple control structures of the same type (changed) with a single invocation.

Response routine 26—to assist Request Management Subcomponent 32 routines in the building of response messages, and to assemble the response and cache update information into a properly formatted response message. The Response routine has two aspects.

1. It supplies a Getbuffer Service used throughout the Data Access System for providing buffers that hold response information. For this service, it not only supplies the buffers, but also implicitly accounts for them, accumlating lists of buffers acquired in preparation for assembling the response for the current request.

2. It builds the response to the current request from several sources:
   a. It invokes the Cache Management RETRIEVE routine for finding all of the Cache Notification Records (CNRs) and placing them in buffers supplied by the Response Routine.
   b. It builds a locator list of buffers consisting of the CNR buffers, buffers allocated by the Getbuffer Service, and standard request diagnostic information. This locator list is sent to the Service System for return of the response to the requesting Application Support Processor.

Work routine 28—to coordinate and initiate processing required when a logical group of requests are "committed" or "rolled back", i.e. manage activities at designated points of recovery (termination of a work unit). The Work routine 28 supports the commit and rollback explicit requests as well as implicit commit and rollback conditions. For explicit requests, the Work routine 28 is invoked through the Request Management Subcomponent 32. To maintain consistency and integrity, actual catalog updates are deferred until the successful completion of the work unit. The Work routine 28 invokes:
   a. the Catalog Management Subcomponent 36 to accomplish catalog updates based upon WRBs (Work Request Blocks) built by Request Management Subcomponent 32 routines.
   b. the Space Management Subcomponent 34 to coordinate the update of the Space Catalog based upon WRBs built by Request Management 32 routines.
   c. the Storage Access System 18 to commit changes to file blocks and catalogs.
   d. the Cache Management Subcomponent 38 to store cache notification information (also contained in Work Request Blocks built by the Request Management Subcomponent 32 routines).

Terminate routine 30—to clean up control structures at the conclusion of an activation of the Data Access System 14. The Terminate Routine manages the cleanup of storage and control structures when service to a particular Application Support Processor is ended. Terminations occur from implicit failures (communications between an Application Support Processor and a File Access Processor, deadlock on resources, etc.) and explicit actions (system operator forced, Application Support Processor ended, etc.). Terminations are discovered upon initial entry into Session Management or at any other point when an activation of the Data Access System regains control after an invocation of either the Service System or the Storage Access System. Therefore the Terminate Routine is a service that is invoked from many places in the Data Access System where other File Access Processor components are invoked.

WRB Condense routine 31—supports reduction of multiple changes to the same catalog entry into a single change. The Data Access System utilizes several catalogs for managing file and directory information. Each entry in the Object Catalog, for example, contains descriptive and control information about a particular file. Work Request Blocks (WRBs) are used to save catalog change information from the time of file request processing until the time that the work unit is committed. When multiple WRBs exist for the same catalog entry, they are condensed into a single WRB. This is important for two reasons:
   a. Reduction of the number of catalog update operations (performance).
   b. Support of a special Catalog Management routine called "In-flight Retrieval". When an Application Support Processor request requires retrieval of a particular catalog entry, the In-flight Retrieval routine of Catalog Management is first called upon to search through the chain of commitable WRBs for the current work unit to determine if there is a WRB for the requested catalog entry. If there is, the WRB will contain complete information for that entry, including changes incurred by the current work unit. When a WRB is found, it is used to satisfy the retrieval request in lieu of retrieving the actual catalog entry. This permits processes in the current work unit to always see current work unit catalog changes before they are committed (written in to the catalogs) and made available to other Application Support Processors. This is essential for contextual processing within a work unit. In order for In-flight Retrieval to support return of a single catalog entry image, all changes to that catalog entry must have been condensed to a single WRB.

The Request Management Subcomponent 32 includes routines, illustrated as R1 through R9—although typically totaling thirty to forty routines. It utilizes the Catalog Management Subcomponent 36 to access catalogs, the Space Management Subcomponent 34 to manage logical space, and the Cache Management Subcomponent 38 for cache control processing.

The Request Management Subcomponent 32 builds and maintains WRBs (Work Request Blocks) which go to the Work routine 28 at commit time (successful completion of a work unit) to drive catalog and cache updates.

The Request Management Subcomponent 32 utilizes the Storage Access System 18 directly to engage or disengage one or more logical locks that represent commitments against files and catalogs. It also invokes the Storage Access System 18 to add, delete, and update data blocks associated with particular files according to the requirements of the current request.

The Catalog Management Subcomponent 36 builds the control structures required for invoking the Storage Access System 18 to access the set of catalogs that the Data Access System 14 utilizes for control information for its set of files. Following are the catalogs managed by the Catalog Management Subcomponent 36:
   a. Directory Catalog—each entry describes a named directory which is a collection of files.
   b. Object Catalog—contains an entry for each file, alias (alternate access to a file), and directory. Entries include names, hierarchical relationships (for directories), containing directory, authorization, owner, status, file characteristics, and a list of data block identifiers that are used to access the actual data for the file.
   c. Authorization Catalog—contains Application Support Processor 10 authorizations for files and directories.

d. Space Catalog—contains file space consumption limitations (number of file blocks) for each Application Support Processor 10.

e. Lock Catalog—contains information about locks that carry over past the end of an Application Support Processor 10 processing session.

When requested to retrieve catalog information, the Catalog Management Subcomponent 36 first searches for possible changes made by the current work unit, but not yet written into the catalogs. This is done by searching the Work Request Blocks that represent changes that have not been committed until the end of the work unit.

The Space Management Subcomponent 34 is disclosed and claimed in U.S. Pat. No. 4,888,681 issued to Barnes et al. for "Space Management System for Data Files Having Shared Access". The Space Management Subcomponent 34 manages the logical space for an Application Support Processor 10 represented by a FSCB (File Space Control Block), a local representation of the Space Catalog entry for the Application Support Processor 10. Requests that affect logical space consumption due to changes in the storage consumed by files accomplish space accounting through the Space Management Subcomponent 34.

The Space Management Subcomponent 34 uses the Catalog Management Subcomponent 36 to access the Space Catalog.

The Cache Management Subcomponent 38 is invoked by the Work routine 28 of the Session Management Subcomponent 20 at the successful completion of a work unit (commit) to update the cached data maintained by the Data Access System 14, using information in Work Request Blocks (WRBs) built by the Request Management Subcomponent 32 to establish which directories are to be supported in the cache for the current Application Support Processor 10.

The Cache Management System 38 is described and disclosed in further detail in U.S. Pat. No. 4,897,782 issued to Bennett et al. for "Local Cache Structure for Maintaining Updated File Characteristics in a File Sharing System". The purpose of the Cache Management System 38 is to collect a set (cache) of directory change information, representing updates to file descriptions and characteristics, and periodically distribute them to Application Support Processors for updating of their local caches. These caches improve performance by reducing the occasion for going to a File Access Processor for file information.

Application Support Processors permit files to be grouped in directories. A cache is kept for a particular directory whenever the Application Support Processor "acquires" the directory. In connection with acquiring a directory, the Application Support Processor requests all information about the directory and its files from the File Access Processor. This information is used to initially load the Application Support Processor's local cache. Concurrently, the File Access Processor is notified that the Application Support Processor requires notification of all future changes that affect that directory. This change notification continues until the directory is explicitly "released".

Information for updating the local cache of the Application Support Processors accompanies (piggybacks on) normal response information that is returned from Application Support Processor requests Information for updating the cache includes such things as file names, file lengths, file status, and authorization. The cache change information appears in individual records called Cache Notification Records (CNRs).

In order to manage cache notification information for Application Support Processors, the Data Access System must support the following functions:

1. Record which directories have been acquired by particular Application Support Processors (Cache Management ACQUIRE operation).
2. Recognize changes in directory and file descriptions that affect the cache.
3. Record the directory changes and accumulate the change information until the appropriate time for sending it to the interested Application Support Processors for updating their local caches.
4. Send the change information (CNRs) to the interested Application Support Processors.
5. Remove change information that all interested Application Support Processors have received.
6. Release directories that Application Support Processor have previously "acquired", but no longer require.

The Request Management Subcomponent 32 of the Data Access System supports the Cache Management functions in the following respects.

1. Processes individual requests from the Application Support Processors, and recognizes particular requests that cause a directory to be acquired (begin to receive cache notifications) and invokes Cache Management to put that Application Support Processor on the list of those to be notified for changes to that directory.
2. Recognizes particular requests that cause change to the cache. Generally, these correspond to requests that also cause changes to the following system catalogs, Directory Catalog, Object Catalog, and Authorization Catalog.
3. Builds a Work Request Block (WRB) for each catalog change and adds to it additional information for Cache Management where cache notification is also required. The Work Request Blocks are used to hold this information until the end of the group of requests that comprise a work unit, whereupon the catalogs are updated and Cache Management is called upon to accumulate and store the cache notification information.

Figure 2:
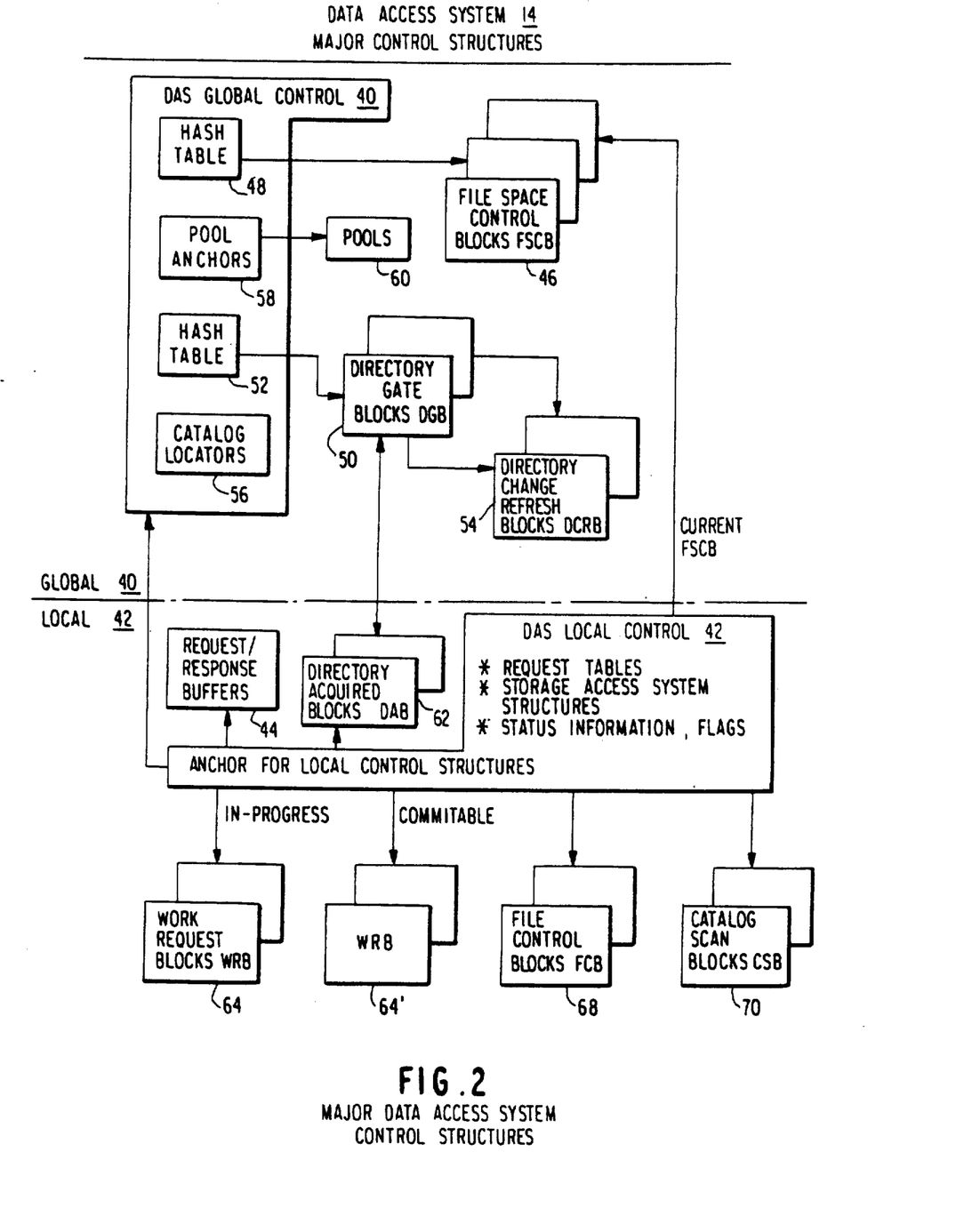
FIG. 2 shows the major control structures of the Data Access System.

FIG. 2 illustrates the major control structures of the Data Access System 14 of the present invention. The following is a description of these major control structures.

One Data Access System (DAS) Global Control structure 40 is provided on a permanent basis for the Data Access System 14. It is the anchor for global control structures, those that are shared by all activations of the Data Access System 14. Since its associated control structures are shared in a multiprocessing environment, appropriate latches associated with each set of structures are provided for controlling concurrent access by participating activations.

A separate Data Access System (DAS) Local Control structure 42 is created for each activation of the Data Access System 14. The Local structure 42 is the basis for controlling the processing of the current request or set of requests from an Application Support Processor 10. It is the anchor for the Request Buffer 44 that is provided by the Service System 16 Processor, as well as response information built by one of the Request Management Subcomponent 32 routines. It also contains status information for request processing, and is the anchor for other control structures that are required to transfer control data between the subcomponents of the Data Access System 14 and with the Storage Access System 18. A DAS Local structure 42 and its parts are created and are maintained only to the end of the current work unit, i.e. for the set of requests serviced by the current activation. At the completion of the work unit, the work is either committed or rolled back.

The following are the primary control structures associated with the DAS Global structure.

File Space Control Blocks 46 (FSCBs) are used to do space accounting for a particular Application Support Processor 10. It provides limits and warning thresholds for the number of data blocks that may be consumed by the associated Application Support Processor 10. A File Space Control Block 46 is built from a Space Catalog entry, and is the basis for updating the Space Catalog when the work unit is committed. File Space Control Blocks 46 are accessed through a Hash Table 48 utilizing a unique identifier for each Application Support Processor 10. File Space Control Blocks 46 are managed by the Space Management Subcomponent 34.

Directory Gate Blocks 50 (DGBs) are used to define directories that are currently maintained in the cache. Each Directory Gate Block 50 represents a cached directory, and is the anchor for change information about files in the directory. Directory Gate Blocks 50 are accessed through a Hash Table 52 hashing on a unique directory identifier. Directory Gate Blocks 50 are managed by the Cache Management Subcomponent 38.

Directory Change Refresh Blocks 54 (DCRBs) record the actual change information about files in a directory. They are used by all Data Access System 14 activations that have the associated directory cached for notifying respective Application Support Processors 10 of the changes. Directory Change Refresh Blocks 54 are managed by the Cache Management Subcomponent 38.

Catalog Locators 56 are used by each Data Access System 14 activation to identify the catalogs when invoking the Storage Access System 18 for catalog access through the Catalog Management Subcomponent 36.

Storage Pool Anchors 58 are maintained for each type of storage pool 60, and provide a basis for fast access to unused storage blocks that may be allocated to a Data Access System 14 activation. Storage pools exist for each major type of control structure in the Data Access System 14. The storage blocks are used to build new control structures. The storage pools 60 are managed by the Storage Pool routine 24 of the Session Management Subcomponent 20.

The major control structures associated with each DAS Local structure 42 are as follows.

Directory Acquired Blocks 62 (DABs) represent each directory that a particular Application Support Processor 10 has acquired for cache purposes. They are managed by the Cache Management Subcomponent 38.

Work Request Blocks 64 (WRBs) are used to retain control information concerning a particular request. The information is used for the following:
a. Holding information read from catalogs,
b. Holding catalog change information until catalogs are updated at the end of a work unit,
c. Saving information for updating the cache at the conclusion of the work unit,
d. Backout processing when the current request processing fails,
e. Searching for changes to catalogs that have not yet been written into the catalogs.

Two chains of Work Request Blocks are used:
In-process Chain 64—represents Work Request Blocks that are associated with processing the current request.
Commitable Chain 64—represents Work Request Blocks from previously completed, but uncommitted requests.

Work Request Blocks 64 are built by Request Management Subcomponent 32 routines and are utilized by the Catalog Management Subcomponent 36, the Space Management Subcomponent 34 and the Cache Management Subcomponent 38.

File Control Blocks 68 (FCBs) are used to retain information about open files. Application Support Processors 10 have available requests that can open files, retrieve information in them, and close them when completed. FCBs are used by some Request Management Subcomponent 32 routines.

Catalog Scan Blocks 70 (CSBs) contain information needed to process a catalog retrieval scan. A CSB 70 is retained until the scan is closed. They are managed by the Catalog Management Subcomponent 36.

SPACE MANAGEMENT IN A DATA ACCESS SYSTEM

The purpose of Space Management is to manage file space assigned to each Application Support Processor, supporting the space management functions: adding space, deleting space, setting thresholds for limit warnings, querying space, charging space used, warning notifications, crediting space freed, and permitting file spaces to be shared by more than one Application Support Processor. The significant design characteristics include:
a. On-line administration of file spaces.
b. Capability for sharing file space between multiple concurrent Application Support Processors.
c. Capability for on-line query of file space status as of the last completed work unit without requiring a separate utility function.

File space is assigned to Application Support Processors 10 by those authorized as administrators. It is consumed as files are created or expanded and reduced as they are deleted or contracted.

Figure 3:
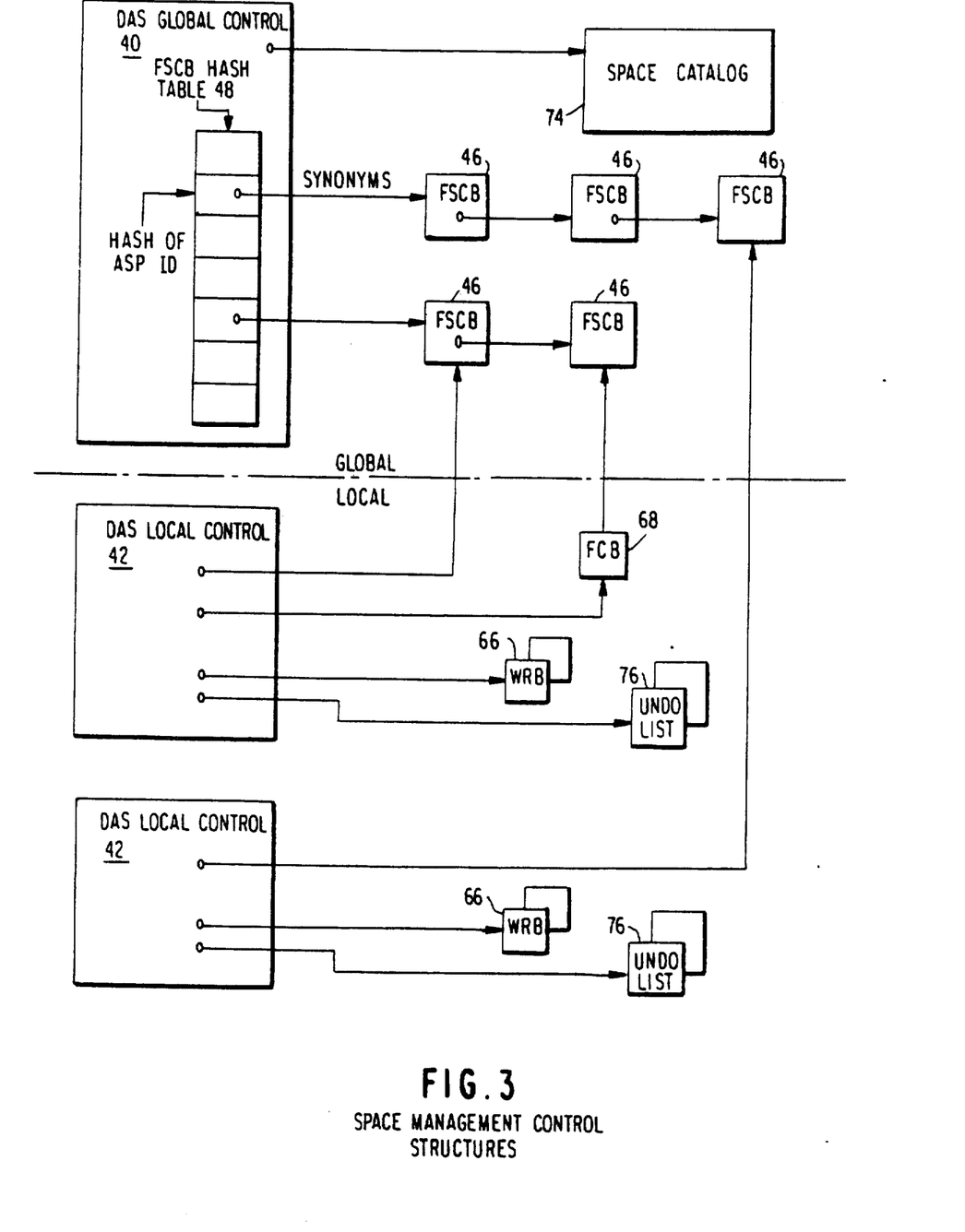
FIG. 3 illustrates the set of control structures which are relevant to the Space Management Subcomponent.

Space management information is permanently recorded in the Space Catalog 74, FIG. 3, which contains a record for each Application Support Processor 10. This record represents a logical file space that is assigned to each Application Support Processor. This record is updated when committing a work unit that impacts the file space. When a work unit is in progress, file space management information is kept in non-permanent storage in a File Space Control Block 46 (FSCB).

An FSCB 46 is initially built from a Space Catalog record when a work unit is begun for an Application Support Processor. A local activation of the Data Access System is initiated to service the requests of the Application Support Processor for File Access Processor 12 work. Since an Application Support Processor may authorize another Application Support Processor to share its file space, the FSCBs that represents file spaces are global to, and potentially shared by, Data Access System activations. If the owning Application Support Processor is not active, FSCB creation may also be initiated by a sharing Application Support Processor when it initiates space consumption activity for the shared file space. When an Application Support Processor initiates file space consumption:

a. in its own file space, the FSCB created during activation initiation is utilized for space management; and b. in a file space owned by another Application Support Processor, it utilizes the FSCB created during the activation of the owning Application Support Processor. If the owner is not active, an FSCB is created by the first non-owner that utilizes the file space.

FIG. 3 illustrates the set of control structures that are relevant to Space Management.

FSCBs 46 are anchored to, and may be located from, FSCB Hash Table 48 entries. The FSCB Hash Table is located in the Global Control structure 40. The Hash Table Entry is determined from a hashing algorithm applied to the owning Application Support Processor ID. The set of synonym FSCBs (assigned to the same data location) represented by collisions in hashing are chained from the associated FSCB Hash Table Entry.

An FSCB may also be found through a locator from the owning Application Support Processor's DAS Local Control 42 where the locator is stored during initialization of the DAS activation.

Logically, an FSCB is no longer needed after a work unit is committed and it has been used to update the Space Catalog record. However:

a. it is more efficient to avoid releasing it when there is a good possibility that it will be needed again by another work unit. Such is the case when the owner commits its work unit; and b. it is necessary to avoid releasing it when there exists an active work unit initiated by a sharing Application Support Processor.

Figure 4:
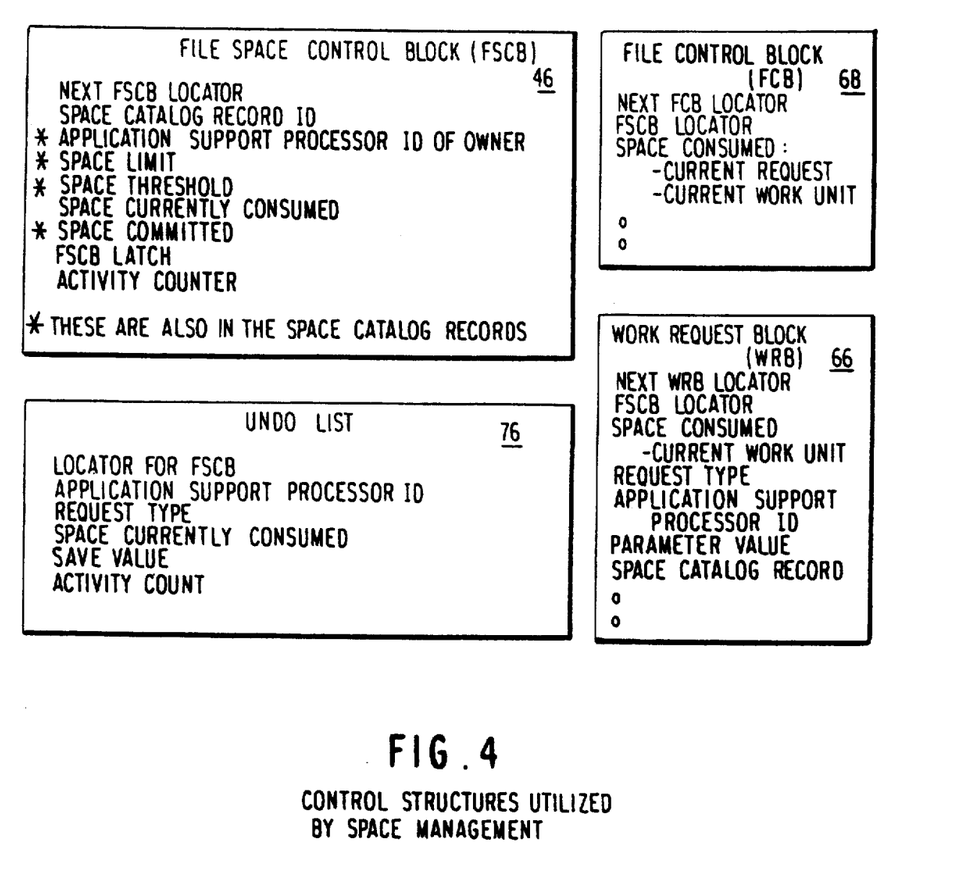
FIG. 4 shows pertinent fields for space management in the FSCB, FCB,,WRB, and UNDO List.

To support these conditions, an Activity Counter is maintained in each FSCB, see FIG. 4. The Activity Counter is incremented by one for each activity initiated that involves the FSCB (change in space consumption) and decremented by one for each committed or terminated activity. The FSCB is released only when its Activity Counter goes to zero. The Activity Counter is incremented when the FSCB is created for the initiation of the owning Application Support Processor's Data Access System activation and decremented when it terminates. It is also incremented when each new file is created or accessed for writing, then decremented when the file activity is committed or terminated. This retains the FSCBs while they are expected to be reused or currently active.

A File Control Block (FCB) 68 is used to retain information about a particular file while it is being accessed by a local activation of an Application Support Processor. It has some particular fields for Space Management, including a locator for the FSCB that is set when the file access is initiated and used for rapid reference to the FSCB thereafter.

When a particular file access is completed successfully, a Work Request Block (WRB) 64 is built. Certain information is transferred from the File Control Block 68 to the Work Request Block 64, and then the File Control Block is released. Work Request Blocks are used to retain information that is needed to update the Object Catalog (changes in file information) and the Space Catalog (changes in space management information) when the work unit is successfully completed (committed). A separate WRB 64 is provided for each record in each catalog that must be updated.

UNDO Lists 76 are used to save the status of FSCBs at the beginning of the current work unit so that they can be restored in the event of a failure in updating the Space Catalog 74 during commit processing.

FIG. 4 shows pertinent fields for space management in the FSCB 46, FCB 68, WRB 64, and UNDO List 76.

The following are FSCB 46 fields not yet discussed:

a. SPACE LIMIT is the total space permitted for files. This is checked when consumption is committed. The commit fails if the limit is exceeded. It is incremented by the ADD-SPACE request and decremented by the DELETE-SPACE request.

b. SPACE THRESHOLD is a percentage of the SPACE LIMIT. It is checked by each file request that affects space consumption for potential generation of a warning for the accessing Application Support Processor. It is changed by the CHANGE-THRESHOLD request.

c. SPACE CURRENTLY CONSUMED is updated for each file request that affects space consumption and is utilized to determine if the SPACE THRESHOLD has been reached.

d. SPACE COMMITTED is updated when the work unit is committed by applying the SPACE CONSUMED-CURRENT WORK UNIT from each WRB 64 that participated in the work unit.

e. FSCB LATCH is used to synchronize changes to the Space Catalog.

The following are pertinent fields in the FCB 68.

a. SPACE CONSUMED-CURRENT REQUEST is the change in space consumption caused by the completion of the most recent request against the file represented by this FCB.

b. SPACE CONSUMED-CURRENT WORK UNIT is the change in space consumption caused by all changes to the file represented by this FCB in the current work unit.

The following are pertinent fields in the WRB 66.

a. SPACE CONSUMED-CURRENT WORK UNIT is the change in space consumption caused by all changes to the file represented by this WRB in the current work unit.

b. REQUEST TYPE is an encoding of the type of request that caused the WRB generation. It is set by the REQUEST MANAGEMENT routine depending on the type of request that is processed (ADD-SPACE, DELETE-SPACE, CHANGE-THRESHOLD, or WRITE-SPACE).

c. PARAMETER VALUE is used to hold the new SPACE LIMIT or SPACE THRESHOLD for ADD-SPACE, DELETE-SPACE, and CHANGE-THRESHOLD requests so that it is available for modifying the FSCB and Space Catalog at commit time.

d. SPACE CATALOG RECORD is an image of the Space Catalog record. It is read into this area in preparation for selectively updating it.

The following are pertinent fields in the UNDO List 76.

a. REQUEST TYPE is the type of request that caused the commit processing b. SPACE CURRENTLY CONSUMED is the accumulated value of all SPACE-WRITE consumption for the associated FSCB for the current work unit.

c. SAVE VALUE is the value of SPACE LIMIT (for ADD-SPACE or DELETE-SPACE), SPACE THRESHOLD (for
c. CHANGE-THRESHOLD) or SPACE COMMITTED (for SPACE-WRITE) in the FSCB before applying the changes associated with the current work unit.

d. ACTIVITY COUNT is the total changes to the ACTIVITY COUNT for the associated FSCB due to the changes applied for the current work unit.

Figure 5:
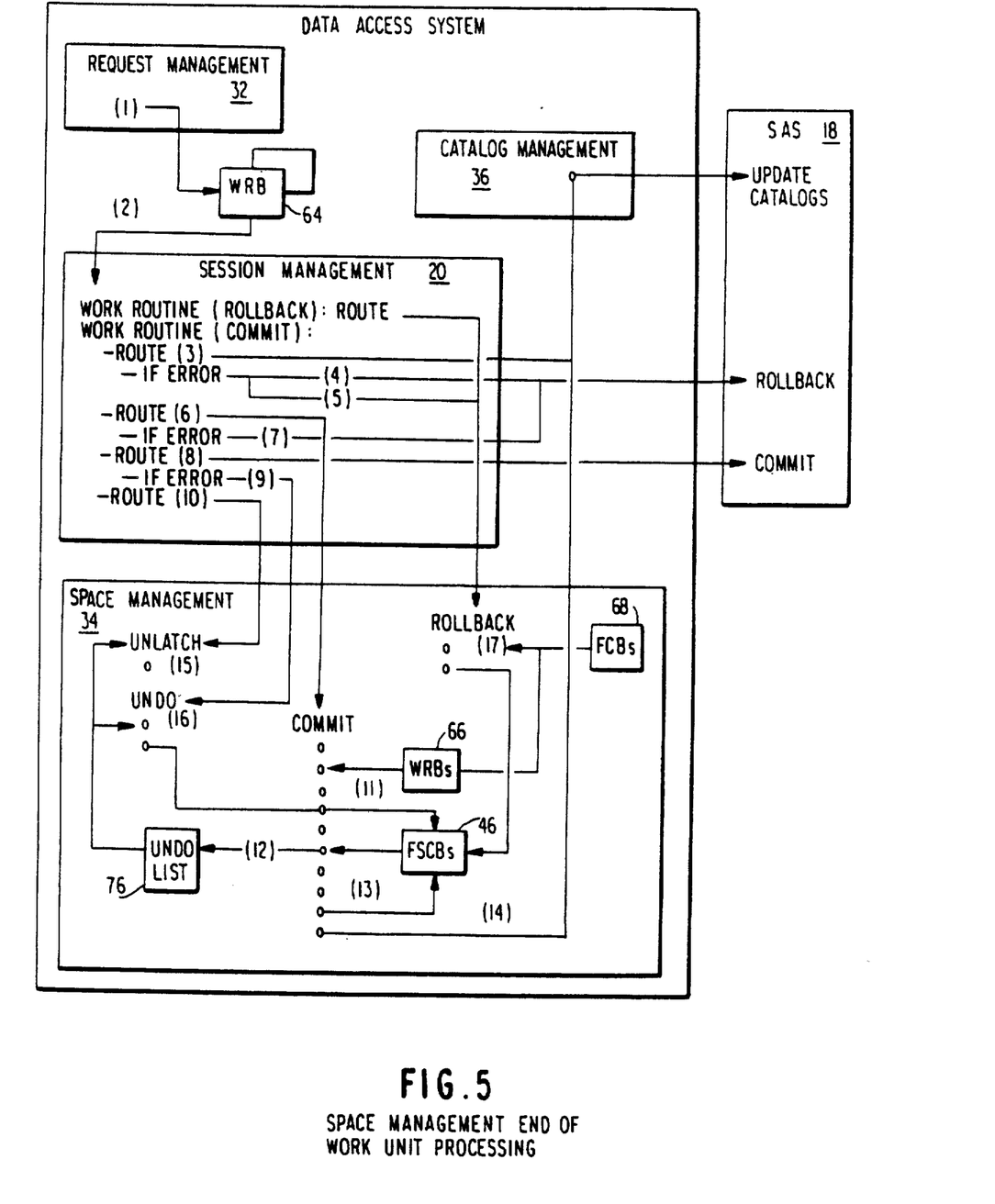
FIG. 5 illustrates the flow of control and data which occurs at the completion of a work unit (commit or rollback).

FIG. 5 illustrates the flow of control and data that occurs at the completion of a work unit (commit or rollback).

1. Request Management 32 routines that cause changes in file space consumption build WRBs containing information required for updating FSCBs and Space Catalog records. These WRBs accumulate until the completion of the work unit.

2. At the completion of the work unit, the Work Routine of Session Management 20 processes successful (commit) or unsuccessful (rollback) work. For the commit of space management, this involves coordinated update of the FSCB and the corresponding Space Catalog records for which other Application Support Processors may concurrently have outstanding work units. For rollback of space management, the Space Management 34 Rollback operation is invoked to restore the FSCB SPACE CURRENTLY CONSUMED field to the value at the beginning of the work unit.

3. In addition to Space Catalog changes, the WRBs also cause updates to the Object Catalog (file characteristic and description changes). The Work Routine 28 invokes Catalog Management 36 to make these changes to the Object Catalog.

4. If there is an error in the update of the Object Catalog, the Storage Access Processor 18 does rollback processing to reverse all catalog and file changes for the current work unit.

5. In addition, such an error causes invocation of Space Management 34 to restore the original value of SPACE CURRENTLY CONSUMED in the FSCBs (Rollback operation in Space Management), and the Work Routine commit processing is terminated.

6. With the successful update of the Object Catalog, Space Management 34 is invoked to update the Space Catalog. This is done by the Commit operation of Space Management.

7. If there is a failure in the Space Management Commit operation, the Storage Access System 18 must rollback all catalog changes and the Work Routine 28 commit processing is terminated.

8. The Storage Access System 18 is invoked to commit all of the catalog changes and file changes for the current work unit.

9. If the Storage Access System 18 commit for the current work unit fails, the Space Management 34 UNDO operation is invoked to backout any changes to the FSCB made for the current work unit. FSCB latches are also released.

10. If commit processing is successful, the Space Management 34 UNLATCH operation is invoked to release latches on FSCBs. Latches are required by the Space Management COMMIT operation and held during Storage Access Processor 18 commit to ensure that another Application Support Processor does not attempt to use the FSCBs to commit its work unit until the current work unit commit is completed.

11. The Space Management 34 COMMIT operation processes all WRBs for the current work unit that have recorded space management changes.

12. Before applying changes to the FSCB, the FSCB latch is acquired and the status of the FSCB is saved in the UNDO List 76 so that it can be restored in the event of a failure. The UNDO List is also used to indicate which FSCBs have been latched for the commit.

13. The WRB changes are applied to the corresponding FSCBs.

14. Catalog Management 36 is invoked to update the Space Catalog 74 accordingly.

15. The Space Management 34 Unlatch operation releases latches for each FSCB that is represented in the UNDO List.

16. The Space Management 34 UNDO operation processes the UNDO List, releasing latches and restoring all FSCBs to their status before the work unit began.

17. The Space Management 34 Rollback operation uses the SPACE CONSUMED-CURRENT WORK UNIT in either the WRBs or FCBs to back out the affect of the current work unit on the SPACE CURRENTLY CONSUMED field in the corresponding FSCBs. FCBs apply for those cases where no WRB had been created from the FCB at the time of the failure.

Latches are mechanisms which provide serialization between multiple Data Access System activations that may operate concurrently. The following two types of latches are used in Space Management:

The Hash Table Entry Latch—which synchronizes the following for a particular synonym chain of FSCBs: searching for FSCBs, adding FSCBs, deleting FSCBs, changing the ACTIVITY COUNT for an FSCB in the chain, and changing SPACE CURRENTLY CONSUMED for an FSCB in the chain.

The FSCB Latch—which synchronizes Space Catalog updates, preventing other activations from doing likewise for the latched FSCB until the commit by the latching activation is complete. When multiple FSCBs are involved in a single commit, latches are acquired for the FSCBs, and Space Catalog updates occur in an order dictated by their respective Application Support Processor ID values. This assures that deadlocks between sharing activations are prevented.

When both types of latches are required concurrently, the Hash Table Entry Latch is acquired first to prevent deadlocks.

The following operations are supported by Space Management 34:

1. ADD-SPACE

This operation adds to the file space permitted for the specified Application Support Processor. Input is the Application Support Processor ID and the space quantity increment.

Build a WRB for the request.
Set the REQUEST TYPE to ADD-SPACE.
Store the Application Support Processor ID.
Put the space quantity increment value in the PARAMETER VALUE field.
Put the WRB in the chained list for processing at the end of the work unit.

2. DELETE SPACE

This operation reduces file space permitted for the specified Application Support Processor. Input is the Application Support Processor ID and the space quantity for reduction.

Processing is about the same as for ADD-SPACE except the REQUEST TYPE is DELETE-SPACE.

3. CHANGE-THRESHOLD

This operation changes the threshold value for the file space, changing the point at which warnings will occur. Input is the new threshold percentage and the Application Support Processor ID.

Build a WRB for the request.
Set the REQUEST TYPE to CHANGE-THRESHOLD.
Store the Application Support Processor ID.
Put the new threshold value in the PARAMETER VALUE field.
Put the WRB in the chained list for processing at the end of the work unit.

4. CHECK-THRESHOLD

This operation updates the SPACE CURRENTLY CONSUMED field of the FSCB and returns an indicator if the threshold has been reached. Input is the Application Support Processor ID, the change value, and an FCB locator.

Hash the Application Support Processor ID to determine the Hash Table Entry.
Acquire the latch for the Hash Table Entry.
Add the SPACE CONSUMED-CURRENT REQUEST of the FCB to the SPACE CURRENTLY CONSUMED of the FSCB.
If SPACE CURRENTLY CONSUMED = the product of the SPACE THRESHOLD and the SPACE LIMIT, then return a warning indicator.
Add SPACE CONSUMED-CURRENT REQUEST to SPACE CONSUMED-CURRENT WORK UNIT.
Release the latch on the Hash Table Entry.

5. QUERY-SPACE

This operation returns information from the Space Catalog for the specified Application Support Processor. Information includes SPACE LIMIT, SPACE THRESHOLD, and SPACE COMMITTED.

Read the appropriate Space Catalog record.
Return the information from the record.

6. CREATE-FSCB

This operation attempts to find an existing FSCB for the specified Application Support Processor. If an existing FSCB is found, the ACTIVITY COUNT is incremented by one. If an existing FSCB is not found, an FSCB is created. Input is an Application Support Processor ID. An FSCB locator is returned.

Hash the Application Support Processor ID to get the Hash Table Entry.
Acquire the latch for the Hash Table Entry.
Search for the FSCB for the Application Support Processor in Hash Table synonym chain.
If FSCB not found:
  Read the Space Catalog record for the Application Support Processors file space.
  Build an FSCB from the Space Catalog record. Set the ACTIVITY COUNT to one.
  Put the FSCB in the Hash Table synonym chain.
If FSCB found, increment ACTIVITY COUNT by one.
Release the latch on the Hash Table Entry.
Return the locator to the FSCB.

7. ACQUIRE-FSCB

This operation uses an FSCB locator to go directly to an FSCB and increments its ACTIVITY COUNT by one. Input is an FSCB locator. The operator is used in lieu of CREATE FSCB when the locator is known.

Use the Application Support Processor ID in the FSCB located using the input parameter locator to hash to an FSCB Hash Table Entry.
Acquire a latch for the Hash Table Entry.
Increment the ACTIVITY COUNT of the FSCB by one.
Release the latch for the Hash Table Entry.

8. RELEASE-FSCB

This operation releases the current FSCB from the Data Access System. There is no input. The FSCB locator from the current DAS Local Control is used.

Use the Application Support Processor ID in the FSCB located using the input parameter locator to hash to an FSCB Hash Table Entry.
Acquire a latch for the Hash Table Entry. Decrement the ACTIVITY COUNT of the FSCB by one. If the ACTIVITY COUNT is zero, release the FSCB from the Data Access System.
Release the latch for the Hash Table Entry.

9. COMMIT

This operation applies changes for the current work unit to the FSCB and uses the changes to update the corresponding Space Catalog records. Input is a chained list of WRBs containing file space change information.

Order all WRBs by the Application Support Processor ID.
Process each WRB in the order; for each:
  If REQUEST TYPE = ADD-SPACE, DELETE-SPACE, or CHANGE-THRESHOLD, then invoke CREATE-FSCB (for the WRITE-SPACE requests, this will have been done by a file access routine of Request Management 32 when the file was first accessed).
  If this is the first WRB for the Application Support Processor ID, then:
    a. Hash the Application Support Processor ID to determine the FSCB Hash Table entry.
    b. Acquire the FSCB latch.
    c. Save the FSCB Locator, REQUEST TYPE, and Application Support Processor ID in the UNDO List from the corresponding values for the associated FSCB.
    d. If the REQUEST TYPE IS ADD-SPACE or DELETE-SPACE, then store the FSCB SPACE LIMIT in the SAVE VALUE field of the UNDO List.
    e. If the REQUEST TYPE IS CHANGE-THRESHOLD, then store the FSCB SPACE THRESHOLD in the SAVE VALUE field of the UNDO List.
    f. If the REQUEST TYPE IS WRITE-SPACE, then store the FSCB SPACE COMMITTED in the SAVE VALUE field of the UNDO List.
  Add one to the ACTIVITY COUNT in the UNDO List.
  If REQUEST TYPE is ADD-STORAGE, then increment the SPACE LIMIT in the FSCB by the value of the PARAMETER VALUE in the WRB.

If REQUEST TYPE is DELETE-STORAGE, then decrement the SPACE LIMIT in the FSCB by the value of the PARAMETER VALUE in the WRB If REQUEST TYPE is CHANGE-THRESHOLD, then replace the SPACE THRESHOLD in the FSCB with the value of the PARAMETER VALUE in the WRB.

If REQUEST TYPE IS WRITE-SPACE, then:
  a. Add the SPACE CONSUMED-CURRENT WORK UNIT of the WRB to the SPACE COMMITTED of the FSCB and the SPACE CURRENTLY CONSUMED Of the UNDO List.
  b. If SPACE COMMITTED Of the FSCB is greater than SPACE LIMIT of the FSCB, then set the error indicator.
  c. If this is the last WRB for an Application Support Processor ID, update the Space Catalog record with the changed values from the corresponding FSCB.

If the error indicator is set, then invoke the UNDO operation.

10. ROLLBACK

This operation reverses updates to the SPACE CURRENTLY CONSUMED field of all FSCBs associated with the current work unit. WRBs and FCBs for the current work unit are used as input.

Process all FCBs for the work unit:
  a. Use FSCB LOCATOR in the FCB to get the Application Support Processor ID.
  b. Hash it to the Hash Table Entry.
  c. Acquire the Hash Table Entry latch.
  d. Reduce the ACTIVITY COUNT in the FSCB by one.
  e. If the ACTIVITY COUNT is zero, release the FSCB.
  f. If the activity count is not zero, reduce the SPACE CURRENTLY CONSUMED in the FSCB by the value in the SPACE CONSUMED-CURRENT WORK UNIT of the FCB.
  g. Release the latch on the Hash Table Entry.

Process all WRBs for the work unit:
  a. Use FSCB LOCATOR in the WRB to get the Application Support Processor ID.
  b. Hash it to the Hash Table Entry.
  c. Acquire the Hash Table Entry Latch.
  d. Reduce the ACTIVITY COUNT In the FSCB by one.
  e. If the ACTIVITY COUNT is zero, release the FSCB.
  f. If the ACTIVITY COUNT is not zero, reduce the SPACE CURRENTLY CONSUMED in the FSCB by the value in the SPACE CONSUMED-CURRENT WORK UNIT of the WRB.
  g. Release the latch on the Hash Table Entry.

11. UNDO

This operation reverses all changes to FSCBs for the current work unit, reduces the ACTIVITY COUNT for FSCBs, and releases the latches on the FSCBs. Input is an UNDO List.

Process each element of the UNDO List:
Hash the Application Support Processor ID.
Acquire the Hash Table Entry Latch.

If REQUEST TYPE is WRITE-SPACE, then
  a. Restore SPACE COMMITTED in the FSCB with the SAVE VALUE of the UNDO entry.
  b. Reduce SPACE CURRENTLY CONSUMED in the FSCB by the value of SPACE CURRENTLY CONSUMED in the UNDO entry.

If REQUEST TYPE is ADD-SPACE or DELETE-SPACE, then Restore SPACE LIMIT in the FSCB with the SAVE VALUE of the UNDO entry.

If REQUEST TYPE is CHANGE-THRESHOLD, then Restore SPACE THRESHOLD in the FSCB with the SAVE VALUE of the UNDO entry.

Reduce ACTIVITY COUNT in the FSCB by the value of the ACTIVITY COUNT in the UNDO entry.

If the ACTIVITY COUNT is zero, release the FSCB. Release the FSCB Latch.

If the ACTIVITY COUNT is zero, then release the FSCB.

Release the latch on the FSCB Hash Table Entry.

12. UNLATCH

This operation release latches on all FSCBs for which latches were acquired in the current work unit and reduces the ACTIVITY COUNT for the FSCBs.

Process each element of the UNDO List:
Hash the Application Support Processor ID.
Acquire the Hash Table Entry Latch.
Reduce ACTIVITY COUNT in the FSCB by the value of the ACTIVITY COUNT in the UNDO entry.

If the ACTIVITY COUNT is zero, release the FSCB. Release the FSCB Latch.

If the ACTIVITY COUNT in the FSCB is zero, then release the FSCB.

Release the Latch on the FSCB Hash Table Entry.

While a preferred embodiment and several variations of the present invention for a Data Access System for a File Access Processor are described in detail herein, it should be apparent that the disclosure and teachings of the present invention will suggest many alternative designs to those skilled in the art.

What is claimed is:

1. A data access system for a file access processor which services requests regarding data in files, such as copy, delete, open and close files, from a plurality of application support processors, with the data access system managing shared access by said application support processors to data files and information about files contained in file directories, said data access system having allocated blocks of storage and interfacing with said application support processors by means of a service system, said service system providing a request buffer for each request from an application support processor, said data access system comprising:

a. a global control structure serving as an anchor for control structures shared by all activations of said data access system and one or more local control structures created for each activation of said data access system and serving as an anchor for a request buffer provided by said service system;

b. a session management subcomponent which is at the hierarchical top of processing of requests for data and provides the primary supervision of service requests to the data access system, including the routing of a service request to and the passing of control for that service request to a service routine for handling thereof by the data access system, said session management subcomponent including a plurality of fundamental service routines for response formulation including,
  i. a start-up routine for initializing said control structures of the data access system,
  ii. a work routine for managing rollback of control at a successful completion of a work unit, after which the work unit is committed at commit time to completion, or an unsuccessful completion of a work unit, after which the work unit is rolled back at rollback time,
  iii. a pool routine for allocating and de-allocating control structures from blocks of storage, and
  iv. a terminate routine for managing the termination of control structures when service to a particular application support processor is terminated;
c. a request management subcomponent for building and maintaining work request blocks, from a plurality of processing routines therein, upon direction from said session management subcomponent, and which are directed to said work routine at commit time upon the successful completion of a work unit and upon which file data updates are made by said data access system, each of said work request blocks retaining control information concerning a particular request from an application support processor;
d. a space management subcomponent which accesses said work request blocks for managing logical space for an application support processor;
e. a permanent storage in the form of catalogs for retaining shared information about files, directories, and control information; and
f. a catalog management subcomponent which accesses said work request blocks for building said local control structures required to invoke a storage access system to access said catalogs used by the data access system for control information for its set of files.

2. A data access system for a file access processor which services requests regarding data in files from a plurality of application support processors, as claimed in claim 1, wherein the data access system also includes a cache management subcomponent for updating cached data maintained in application support processors at the successful completion and commit of a work unit, and wherein each application support processor includes therein an internal cache of file information, which is updated periodically by the file access processor, for reducing required communications with the file access processor.

3. A data access system for a file access processor which services requests regarding data in files from a plurality of application support processors, as claimed in claim 2, wherein said global control structure provides a basis for locating directory gate blocks for defining directories currently maintained in the internal caches of said application support processors.

4. A data access system for file access processor which services requests regarding data in files from a plurality of application support processors, as claimed in claim 1, wherein separate and different access methods are utilized for said catalogs and for file data.

5. A data access system for a file access processor which services requests regarding data in files from a plurality of application support processors, as claimed in claim 4, wherein the data access system provides for previewing of catalog changes in which the originating application support processor sees changes before they are committed at the end of a work unit, and other application support processors do not have access to the changes until after the commit, with the previewing of catalog changes being supported by a deferred updating of a catalog until the successful completion and commit of a work unit concerning catalog change information, and in which work request blocks save catalog change information until the work unit is committed, and by a search of work request blocks before reading information from a catalog.

6. A data access system for a file access processor which services requests regarding data in files from a plurality of application support processors, as claimed in claim 1, wherein said global control structure provides a basis for locating file space control blocks supporting dynamic threshold warnings for warning that a threshold level of a file space consumption limit is being exceeded and space consumption limits for the number of data blocks that can be consumed by a particular application support processor.

7. A data access system for a file access processor which services requests regarding data in files from a plurality of application support processors, as claimed in claim 1, wherein said global control structure provides a basis for locating directory change refresh blocks for recording change information about files in a directory.

8. A data access system for a file access processor which services requests regarding data in files from a plurality of application support processors, as claimed in claim 1, wherein said local control structures includes means for locating work request blocks used to retain control information about a particular work request from an application support processor, said local control structures supporting deferred updates of said catalogs, space consumption limits and cache updates.

9. A data access system for a file access processor which services requests regarding data in files from a plurality of application support processors, as claimed in claim 1, wherein said local control structure provides a basis for locating file control blocks for retaining information about open files.

10. A data access system for a file access processor which services requests regarding data in files from a plurality of application support processors, as claimed in claim 1, wherein said space management subcomponent includes means for controlling file space consumption limits, wherein multiple application support processors can consume space in a file space concurrently, while enforcing and supporting a common set of space consumption limits and thresholds.

11. A data access system for a file access processor which services requests regarding data in files from a plurality of application support processors, as claimed in claim 1, wherein said file access processor includes a service system which provides environmentally dependent services for the file access processor, including an initial receipt of requests for file access, forwarding requests for file access, and activating the data access system, with the activations being continued through a set of file requests that represent a recoverable work unit.

* * * * *